United States Patent [19]
Heydinger

[11] Patent Number: 5,894,544
[45] Date of Patent: Apr. 13, 1999

[54] METHOD OF TRANSMITTING DATA FROM A HOST COMPUTER TO A PRINTER TO REDUCE TRANSMISSION BANDWIDTH

[75] Inventor: Scott Michael Heydinger, Lexington, Ky.

[73] Assignee: Lexmark International, Inc., Lexington, Ky.

[21] Appl. No.: 08/838,218

[22] Filed: Apr. 3, 1997

[51] Int. Cl.⁶ .................... G06T 15/00; G05B 15/00
[52] U.S. Cl. .................... 395/114; 395/108; 395/114; 358/501; 358/464; 358/474; 382/176; 382/180
[58] Field of Search .................... 395/114, 200.77, 395/101, 2.91, 888, 108, 102, 103, 106, 107, 117; 364/715.02; 382/173, 235, 176, 180, 283; 358/501, 401, 464, 465, 434, 487, 493, 505, 455, 296, 476

[56] References Cited

U.S. PATENT DOCUMENTS

| | | | |
|---|---|---|---|
| 4,271,476 | 6/1981 | Lotspiech | 382/235 |
| 5,341,318 | 8/1994 | Balkanski et al. | 364/725.03 |
| 5,488,491 | 1/1996 | Steinkirchner | 358/501 |
| 5,506,687 | 4/1996 | Gillard et al. | 386/21 |
| 5,515,481 | 5/1996 | Pardo | 395/117 |
| 5,604,843 | 2/1997 | Shaw et al. | 395/101 |
| 5,629,777 | 5/1997 | Moro | 358/401 |
| 5,710,830 | 1/1998 | Holeva | 382/173 |
| 5,760,922 | 6/1998 | Kojima | 358/464 |
| 5,761,339 | 6/1998 | Ikeshoji et al. | 382/176 |

*Primary Examiner*—Scott Rogers
*Assistant Examiner*—Douglas Q. Tran
*Attorney, Agent, or Firm*—John J. McArdle; Ronald K. Aust

[57] ABSTRACT

The invention is directed to a method of transmitting data from a host computer to a printer. Image data is provided which represents at least a portion of a print image to be printed by the printer. Locations of absolute zero values in the image data and locations of non-absolute zero values in the image data are defined. The locations of the absolute zero values and the locations of the non-absolute zero values are mutually exclusive from each other. Both host computer and the printer are instructed of the locations of the absolute zero values in the image data. Only the image data having non-absolute zero values is transmitted from the host to the printer.

2 Claims, 2 Drawing Sheets

| 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| 1 | 0 | 0 | 0 | 1 | 1 | 1 | 1 | 1 | 0 | 1 | 0 | 0 | 1 | 1 | 1 |

1 BYTE | 1 BYTE

PRIOR ART
Fig. 4

RASTER 1

| 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| 0 | 0 | 0 | 0 | 0 | 1 | 0 | 1 | 0 | 0 | 0 | 0 | 0 | 1 | 0 | 1 |

1 BYTE | 1 BYTE

PRIOR ART
Fig. 5

RASTER 2

| 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|
| 1 | 0 | 0 | 0 | 1 | 0 | 1 | 0 | 1 | 0 | 1 | 0 | 0 | 0 | 1 | 0 |

1 BYTE | 1 BYTE

PRIOR ART
Fig. 6

PASS 1

| 16 | 14 | 12 | 10 | 8 | 6 | 4 | 2 | | | | | | | | |
|---|---|---|---|---|---|---|---|---|---|---|---|---|---|---|---|
| 1 | 0 | 1 | 1 | 1 | 1 | 0 | 1 | | | | | | | | |

SLICE 2 | SLICE 1 | COMMAND BYTE

Fig. 7

PASS 2

| 15 | 13 | 11 | 9 | 7 | 5 | 3 | 1 |
|---|---|---|---|---|---|---|---|
| 0 | 0 | 1 | 1 | 0 | 0 | 1 | 1 |

SLICE 2 | SLICE 1

Fig. 8 and utilized by the printer for firing the heater elements in the printhead in a checkerboard pattern. In a next pass of the printhead across the print medium, the corresponding image data is manipulated by the host computer such that a complementary every other bit is assigned a zero value and transferred from the host computer to the printer. The amount of data in the image data for the two passes of the printhead across the print medium when carrying out a 50% shingling technique is thus twice the amount of data necessary during normal, non-shingled printing.

A checkerboard pattern as described above is shown in FIG. 2, with implied zeros being represented by a "0" and non-implied zeros (i.e., data having a value of either 0 or 1) being represented by an "X". The data shown in FIG. 2 is arranged in vertical slices, with each slice corresponding to a byte of data in FIG. 3. The data in each slice is arranged in a top down manner. Thus, the first bit of slice 1 is an "0" and the first bit of slice 2 is an "X".

It is also known to transfer all of the original image data from the host computer to the printer during a shingling process and use the electrical processor within the printer to manipulate the data and insert known zero data bits within the image data for each scan of the printhead. For example, referring to FIG. 4, two bytes of image data to be printed by the printer (with each bit labeled 1 through 16), may be directly transferred from the host computer to the printer. The electrical processor in the printer is used to manipulate bits 1–16 during a 50% shingling routine such that known zero values within the two bytes of data are substituted by the electrical processor in the printer. More particularly, during a first scan using a 50% shingling technique, the even numbered bits 2, 4, 6 ... 16 are assigned a zero value by the electrical processor in the printer, with the actual values of the odd numbered bits 1, 3, 5 ... 15 remaining unchanged (FIG. 5). The altered two bytes of data are then used by the printer for firing heater elements in the printhead in a checkerboard manner. During a second scan of the printhead across the print medium, the odd numbered bits 1, 3, 5 ... 15 are assigned zero values by the electrical processor in the printer, and the actual values of the even numbered bits 2, 4, 6 ... 16 remain unchanged (FIG. 6). This manipulated image data is used by the printer during the second scan of the printhead to print ink dots on the print medium in a checkerboard pattern which is complementary to the first scan of the printhead.

SUMMARY OF THE INVENTION

The present invention provides a method of decreasing the transmission bandwidth of the image data transferred from the host computer to the printer for a particular scan of the printhead by only transmitting non-absolute zero value information in the image data from the host computer to the printer.

The invention comprises, in one form thereof, a method of transmitting data from a host computer to a printer. Image data is provided which represents at least a portion of a print image to be printed by the printer. Locations of absolute zero values in the image data and locations of non-absolute zero values in the image data are defined. The locations of the absolute zero values and the locations of the non-absolute zero values are mutually exclusive from each other. Both the host computer and the printer are instructed of the locations of the absolute zero values in the image data. Only the image data having non-absolute zero values is transmitted from the host computer to the printer.

An advantage of the present invention is that image data having an absolute value of zero for a particular scan of the printhead (i.e., the locations of the bits in the image data cannot be other than zero because of a particular operating parameter) is not transferred from the host computer to the printer, thereby decreasing the amount of data transferred to the printer for a particular scan.

BRIEF DESCRIPTION OF THE DRAWINGS

The above-mentioned and other features and advantages of this invention, and the manner of attaining them, will become more apparent and the invention will be better understood by reference to the following description of embodiment of the invention taken in conjunction with the accompanying drawings, wherein:

FIG. 4 shows another conventional method of transferring image data from a host computer to a printer during a printing technique employing a 50% shingling algorithm;

FIGS. 5 and 6 illustrate a method of manipulating data with an electrical processor in a printer after the image data shown in FIG. 4 has been received by the printer; and FIGS. 7 and 8 show an embodiment of the method of the present invention for transferring image data from a host computer to a printer during a printing technique employing a 50% shingling algorithm.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
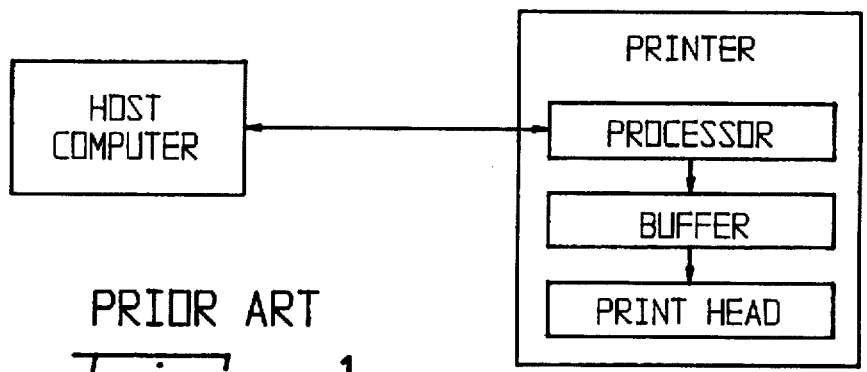
FIG. 1 is a schematic view of a conventional host-based printer connected to a host computer.

Referring now to the drawings and more particularly to FIGS. 7 and 8, there is shown an arrangement of image data representing an embodiment of the method of the present invention for transferring image data from a host computer to a printer during a printing technique employing a 50% shingling algorithm. For purposes of discussion and comparison with conventional methods, the arrangement of data shown in FIGS. 7 and 8 will be described with reference to the original image data shown in FIG. 4. The original image data shown in FIG. 4 is now assumed to be image data contained within the host computer corresponding to locations at which ink droplets are to be jetted onto the print medium.

The method of the present invention for transferring data from the host computer to the printer does not transfer the original image data from the host computer to the printer in an unaltered form, and does not add implied zeros in the data transferred from the host computer to the printer. Rather, the method of the present invention only transmits data from the host computer to the printer which has the potential of being printable data. That is, data which is known to have an absolute value of zero because of an employed printing technique such as a 50% shingling technique is not transmitted from the host computer to the printer.

The two bytes of image data shown in FIG. 4 are assumed, for the purpose of describing the method of the present invention, as being original image data which is contained within the host computer, prior to being transmitted to the printer. The image data represents at least a portion of a print image to be printed by the printer. When a printing technique is to be utilized which does not use all of the available ink emitting orifices during a particular pass of the printhead, image data which is known to have an absolute value of zero is not transmitted from the host computer to the printer. For example, when employing a 50% shingling technique, only 50% of the original image data is used during a particular pass of the printhead across the print medium. The host computer is used to define locations of absolute zero values in the image data and to define locations of non-absolute zero values in the image data. In the case of a 50% shingling technique, the absolute zero value image data corresponds to the image data which is not printed during a particular pass of the printhead, and the non-absolute zero value image data corresponds to image data which has the potential to be printed during a particular pass of the printhead.

For a first pass of a printhead during a 50% shingling technique, the absolute zero value data in the image data is assumed to correspond to the odd numbered bits 1, 3, 5 . . . 15 of the original image data, and the non-absolute zero value image data is assumed to correspond to the even numbered bits 2, 4, 6 . . . 16 of the original image data. The absolute zero value image data and the non-absolute zero value image data are defined by the host computer, which in turns instructs the printer regarding the same. More particularly, the host computer transmits a data flag such as a command byte (FIG. 7) to the printer instructing the printer of the locations of the absolute zero values in the image data. Using the locations of the absolute zero values in the image data, the corresponding locations of the non-absolute zero values in the image data may be inferred by the printer. The actual content, size and placement of bits within the command byte may vary dependent upon the particular application. For example, the command byte may include a plurality of bits indicating that the absolute zero value data during a first pass of the printhead corresponds to the odd numbered bits in the original image data. The printer may then infer that the absolute zero value image data corresponds to the even numbered bits in a second pass of the printhead. Alternatively, the command byte may be used as an express indication that the image data transmitted for the first pass of the printhead only includes even numbered bits and the image data transmitted for the second pass of the printhead only includes odd numbered bits. Additionally, the command byte may include an indication of the number of bytes or the length of the image data for a particular pass of the printhead. Dependent upon the amount of information to be contained within the data flag, the size of the data flag may also vary. In the embodiment shown in FIG. 7, the data flag is one byte of data which is transmitted prior to sending the image data for the first pass of the printhead. For certain applications, however, the data flag may include 1, 2, 4 or other suitable number of bits. Moreover, rather than transmitting a data flag only prior to the first pass of the printhead, separate data flags may be sent at the beginning of each pass of the printhead.

Figure 2:
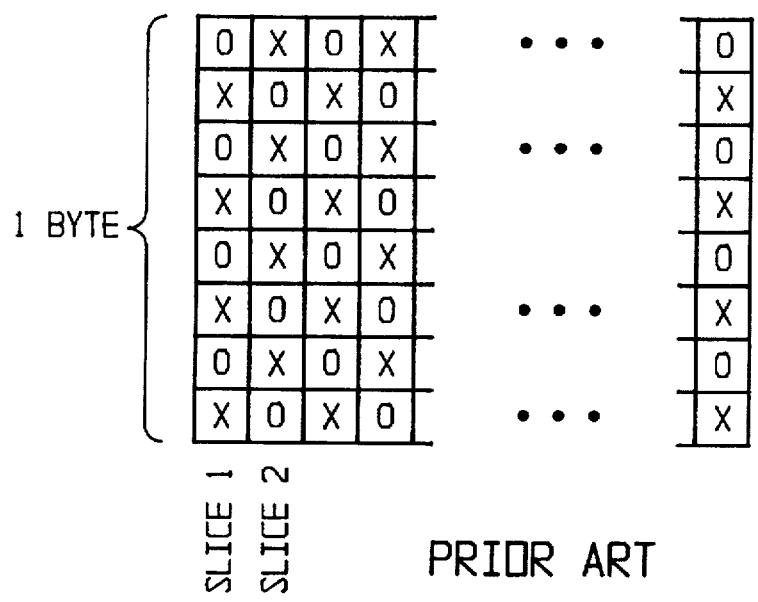
FIG. 2 illustrates a conventional arrangement of image data to be used in a printing technique employing a 50% shingling algorithm.
Figure 3:
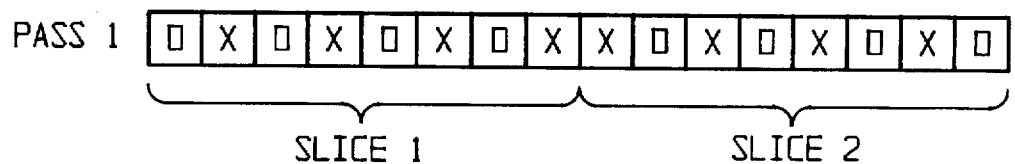
FIG. 3 shows a conventional method of transferring image data shown in FIG. 2 from a host computer to a printer.

During a first pass of the printhead using a 50% shingling technique only the even numbered bits in the original image data will be printed, as described above. The one byte of data corresponding to bits 1–8 shown in FIG. 4 is therefore reduced in size by one-half since only bits 2, 4, 6 and 8 are transmitted to the printer from the host computer. Likewise, the one byte of data including bits 9–16 shown in FIG. 4 is reduced in size by one-half by only transmitting bits 10, 12, 14 and 16 from the host computer to the printer. Using the information contained within the command byte and bits 2, 4, 6 and 8, the printer inserts zeros corresponding to the absolute zero values in the image data to be printed by the printer. Thus, bits 2, 4, 6 and 8 are used by the printer and expanded out by inserting zero values at bits 1, 3, 5 and 7 such that the four bits of data corresponding to slice 1 in FIG. 7 are expanded out to the eight bits of data corresponding to slice 1 in FIG. 2. Of course, the actual values of bits 2, 4, 6 and 8 are substituted for the "X" bits shown in slice 1 in FIG. 2. Similarly, the four bits of data corresponding to slice 2 in FIG. 7 are expanded out to the eight bits of data corresponding to slice 2 in FIG. 2. The method of the present invention therefore allows a reduction by one-half in the amount of image data which is transmitted from the host computer to the printer when using a 50% shingling technique, as compared with the conventional method of transmitting data from the host computer to the printer shown in FIG. 3.

During a second pass of the printhead (FIG. 8), only odd numbered bits from the original image data are transmitted from the host computer to the printer. The four bits of data labeled slice 1 and slice 2 correspond to the eight bits of data labeled slice 1 and slice 2 in FIG. 2. However, it will be appreciated that during a second pass of the printhead, the positions of the "X" and "0" bits are interchanged in FIG. 2. Thus, the four bits of data in slice 1 in FIG. 8 correspond to the data locations represented by "X" bits in FIG. 2, after the "X" and "0" bits are interchanged. Printing is otherwise carried out the same as with regard to the first pass of the printhead described above with reference to FIG. 7.

In the embodiment of the method of the present invention described above, the method is carried out using a 50% shingling technique. However, it is also to be understood that the method of the present invention may be used with any printing technique where at least some of the image data is defined to be absolute zero value image data during printing. For example, a 33% shingling technique uses only approximately ⅓ of the available ink emitting orifices during any particular pass of the printhead. The command byte would therefore include an indication that only every other third bit is being transmitted from the host computer to the printer during any particular pass of the printhead. The printer would thus know, e.g., that bits 1, 4, 7, etc., are transmitted during pass one, bits 2, 5, 8, etc., are transmitted during pass two, and bits 3, 6, 9, etc., are transmitted during pass three of the printhead.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A method of printing data from a host computer onto a print medium using a printer having a printhead, comprising the steps of:

providing an M by N image matrix of bits of non-absolute zero image data representing a print image to be printed by the printer;

dividing said image data into at least two subsets of non-absolute zero image data, said at least two subsets of non-absolute zero image data being substantially interspersed with each other in said M by N image matrix of bits;

placing each of said at least two subsets of non-absolute zero image data into a respective M by N shingle matrix of bits, each bit of said at least two subsets being placed in a location in said respective M by N shingle matrix that corresponds to a location of said bit in said M by N image matrix;

filling in remaining locations in said M by N shingle matrices with absolute zero values;

instructing each of the host computer and the printer of said remaining locations of said absolute zero values in a selected said M by N shingle matrix of bits; and transmitting only said non-absolute zero image data of said selected M by N shingle matrix from the host computer to the printer.

2. The method of claim 1, comprising the further steps of:

printing said non-absolute zero image data of said selected M by N shingle matrix in a first scan of the printhead across the print medium;

instructing each of the host computer and the printer of said remaining locations of said absolute zero values in a second selected said M by N shingle matrix of bits;

transmitting only said non-absolute zero image data of said second selected M by N shingle matrix from the host computer to the printer; and printing said non-absolute zero image data of said second selected M by N shingle matrix in a second scan of the printhead across the print medium.

* * * * *